(12) United States Patent
Rinkes

(10) Patent No.: US 8,421,627 B2
(45) Date of Patent: Apr. 16, 2013

(54) METHOD FOR ASSOCIATING AND RFID TAG WITH A KNOWN REGION

(75) Inventor: Charles Rinkes, Medina, OH (US)

(73) Assignee: Symbol Technologies, Inc., Holtsville, NY (US)

( * ) Notice: Subject to any disclaimer, the term of this patent is extended or adjusted under 35 U.S.C. 154(b) by 536 days.

(21) Appl. No.: 12/195,613

(22) Filed: Aug. 21, 2008

(65) Prior Publication Data

US 2010/0045436 A1 Feb. 25, 2010

(51) Int. Cl.
*G08B 13/14* (2006.01)

(52) U.S. Cl.
USPC ............... 340/572.1; 340/8.1; 340/572.4

(58) Field of Classification Search .......... 340/572.1, 340/572.4, 10.1, 825.49, 8.1; 342/450, 458
See application file for complete search history.

(56) References Cited

U.S. PATENT DOCUMENTS

| | | | | |
|---|---|---|---|---|
| 5,640,151 A * | 6/1997 | Reis et al. | ............ | 340/825.49 |
| 5,774,876 A * | 6/1998 | Woolley et al. | ............ | 340/572.1 |
| 6,040,774 A * | 3/2000 | Schepps | ............ | 340/572.1 |
| 6,600,418 B2 * | 7/2003 | Sainati et al. | ............ | 340/572.1 |
| 7,081,818 B2 * | 7/2006 | Eckstein et al. | ............ | 340/572.1 |
| 7,170,412 B2 | 1/2007 | Knox et al. | | |
| 2005/0110641 A1 | 5/2005 | Mendolia et al. | | |
| 2006/0176152 A1 * | 8/2006 | Wagner et al. | ............ | 340/572.1 |
| 2007/0018793 A1 * | 1/2007 | Stewart et al. | ............ | 340/10.3 |
| 2007/0188318 A1 * | 8/2007 | Cole et al. | ............ | 340/572.1 |
| 2007/0285236 A1 * | 12/2007 | Batra | ............ | 340/572.1 |
| 2007/0296581 A1 * | 12/2007 | Schnee et al. | ............ | 340/572.1 |
| 2009/0212921 A1 | 8/2009 | Wild et al. | | |
| 2010/0148985 A1 | 6/2010 | Lin et al. | | |
| 2010/0201520 A1 | 8/2010 | Stern et al. | | |
| 2011/0050400 A1 | 3/2011 | Ho et al. | | |

OTHER PUBLICATIONS

Final Office Action mailed Apr. 5, 2012 in U.S. Appl. No. 12/336,730, Lang Lin, filed Dec. 17, 2008.
Non Final Office Action mailed Sep. 27, 2011 in U.S. Appl. No. 12/336,730, Lang Lin, filed Dec. 17, 2008.

* cited by examiner

*Primary Examiner* — Thomas Mullen
(74) *Attorney, Agent, or Firm* — Terri Hughes Smith; Kenneth A. Haas

(57) ABSTRACT

A method of associating radio-frequency identification (RFID) tags with a region, location, or container is provided. The method can comprise, among other steps, transmitting an interrogation signal with an RFID reader corresponding to a read zone of a first size, receiving a response from at least one of the plurality of RFID tags in the region as a new tag, recording an indicator of the response of the at least one of the plurality of RFID tags, thereby designating it as a recorded tag, increasing the read zone of the RFID reader until no new tags are detected, and associating of each of the recorded tags with the region.

17 Claims, 5 Drawing Sheets

METHOD FOR ASSOCIATING AND RFID TAG WITH A KNOWN REGION

TECHNICAL FIELD

Embodiments of the subject matter described herein relate generally to radio-frequency identification (RFID) information exchange. More particularly, embodiments of the subject matter relate to associating an RFID tag with a container or location.

BACKGROUND

RFID systems are well known and the prior art is replete with different types of RFID systems, different applications for RFID systems, and different data communication protocols for RFID systems. Briefly, an RFID system includes two primary components: a reader (also known as an interrogator); and a tag (also known as a transponder). The tag is a miniature device that is capable of responding, via an air channel, to a radio-frequency (RF) signal (an interrogation signal) generated by the reader. The tag is configured to generate a reflected RF signal in response (a response signal) to the RF signal emitted from the reader. The reflected RF signal is modulated in a manner that conveys identification data back to the reader.

Because RFID tags respond via radio-frequency transmissions, a single reader or interrogator is often incapable of determining the position of the source of the RFID response signals. For example, a reader can receive a response signal from a tag without learning how far from the reader the tag is, or in which direction from the reader the response signal emanates. Accordingly, it can be difficult to measure position and distance properties of RFID tags with a single RFID reader.

BRIEF SUMMARY

A method of associating radio-frequency identification (RFID) tags with a region is provided. The method comprises transmitting an interrogation signal with an RFID reader corresponding to a read zone of a first size, receiving a response from at least one of the plurality of RFID tags in the region as a new tag, recording an indicator of the response of the at least one of the plurality of RFID tags, thereby designating it as a recorded tag, increasing the read zone of the RFID reader until no new tags are detected, and associating of each of the recorded tags with the region.

A method of associating a first RFID tag with a container is also provided. The method comprises transmitting a first interrogation signal corresponding to a read zone having a first size, receiving a response from the first RFID tag, the first RFID tag disposed in the container, recording an indicator of the response of the first RFID tag as a first recorded RFID tag, thereby designating it as a recorded RFID tag, transmitting a second interrogation signal corresponding to a read zone having a second size, where the second size is larger than the first size, receiving a response from only recorded RFID tags in the read zone with the second size, and associating each recorded RFID tag with the container in response to receiving a response from only recorded RFID tags in the read zone with the second size.

A method of associating RFID tags with a location where the location has boundaries designated by a plurality of boundary RFID tags, and the boundary RFID tags are adapted to convey tag data corresponding to the location is also provided. The method comprises transmitting an interrogation signal to a read zone having a first size, receiving a response from an RFID tag in the read zone, increasing the size of the read zone until the RFID reader receives tag data from at least one of the boundary RFID tags, and associating the RFID tag with the tag data conveyed by the boundary RFID tags.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission protocols and that the system described herein is merely one example embodiment of the invention.

For the sake of brevity, conventional techniques related to radio-frequency identification (RFID) data transmission, RFID system architectures, computing device architectures, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a practical embodiment.

Figure 2:
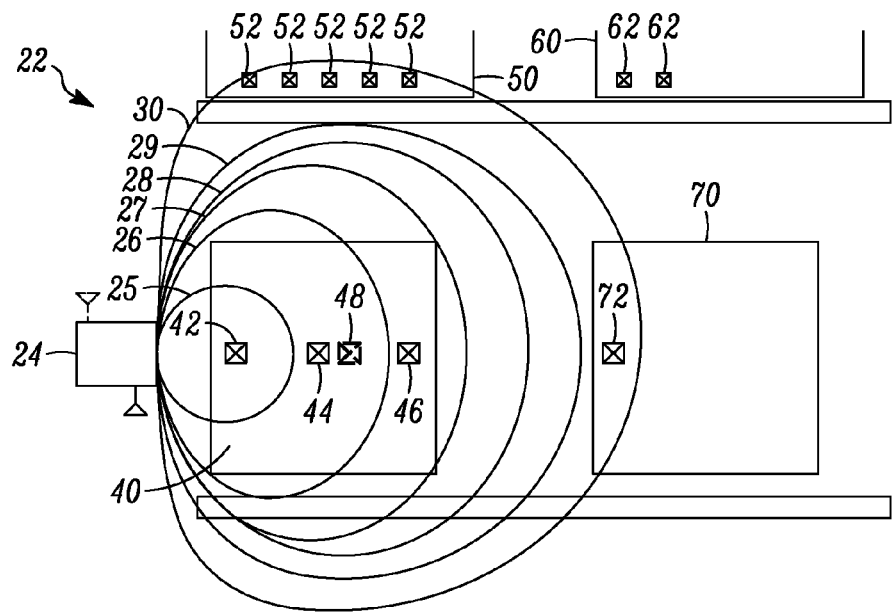
FIG. 2 is a schematic side view of an RFID tag position-finding system.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. For example, although the schematic shown in FIG. 2 depicts one example arrangement of elements such as RFID tags, additional intervening elements, devices, features, or components may be present in an embodiment of the invention.

Briefly, the techniques and technologies described herein leverage the use of RFID tags with and within containers, pallets, storage regions, or the like for tracking and location purposes. Other applications of the methods and systems disclosed herein are also possible. A user may use an off-the-shelf RFID reader, whether or not the reader is operatively coupled to a personal computer (PC), a tablet computer, mobile computing device, such as a personal data assistant (PDA), or the like. Such a computer or computing device can run one or more suitably configured software applications.

In some embodiments, an RFID reader can be disposed near a container of interest. Typically, the reader's user desires to receive information from RFID tags within the container. For example, an RFID tag can be affixed or attached to an item of merchandise. An inventory of merchandise by container can then be determined. Because the RFID tags can convey information identifying the type of item to which they are attached or affixed, such an inventory determination can be quickly accomplished through RFID interrogation. The RFID tags can provide information sufficient to determine the types of items, and the number of items present.

Although the example of affixation of an RFID tag to an item of merchandise is described herein, other uses are contemplated. For example, instead of merchandise items with RFID tags being associated with a container, different containers of a liquid can be associated with a pallet. In other embodiments, several pallets can be associated with a particular location, wherein the pallets are affixed with identifying RFID tags and the location is identified and/or entered into the RFID reader by the user.

Thus, in various embodiments, different types of tag-to-location associations can be performed. Preferably, however, each item to be associated with a container or location or region has an RFID tag which transmits a response conveying identifying information about the item to which the data tag is affixed or associated. For example, each unit of merchandise can have an RFID tag which conveys such information as the type of merchandise and number of units with which each tag is associated. Other information can also be provided, including, but not limited to, initial RFID tag associations, initial group, unit, lot, and/or batch sizes, and date of manufacture or assembly of the merchandise, as well as date of affixation of the RFID tag.

Figure 1:
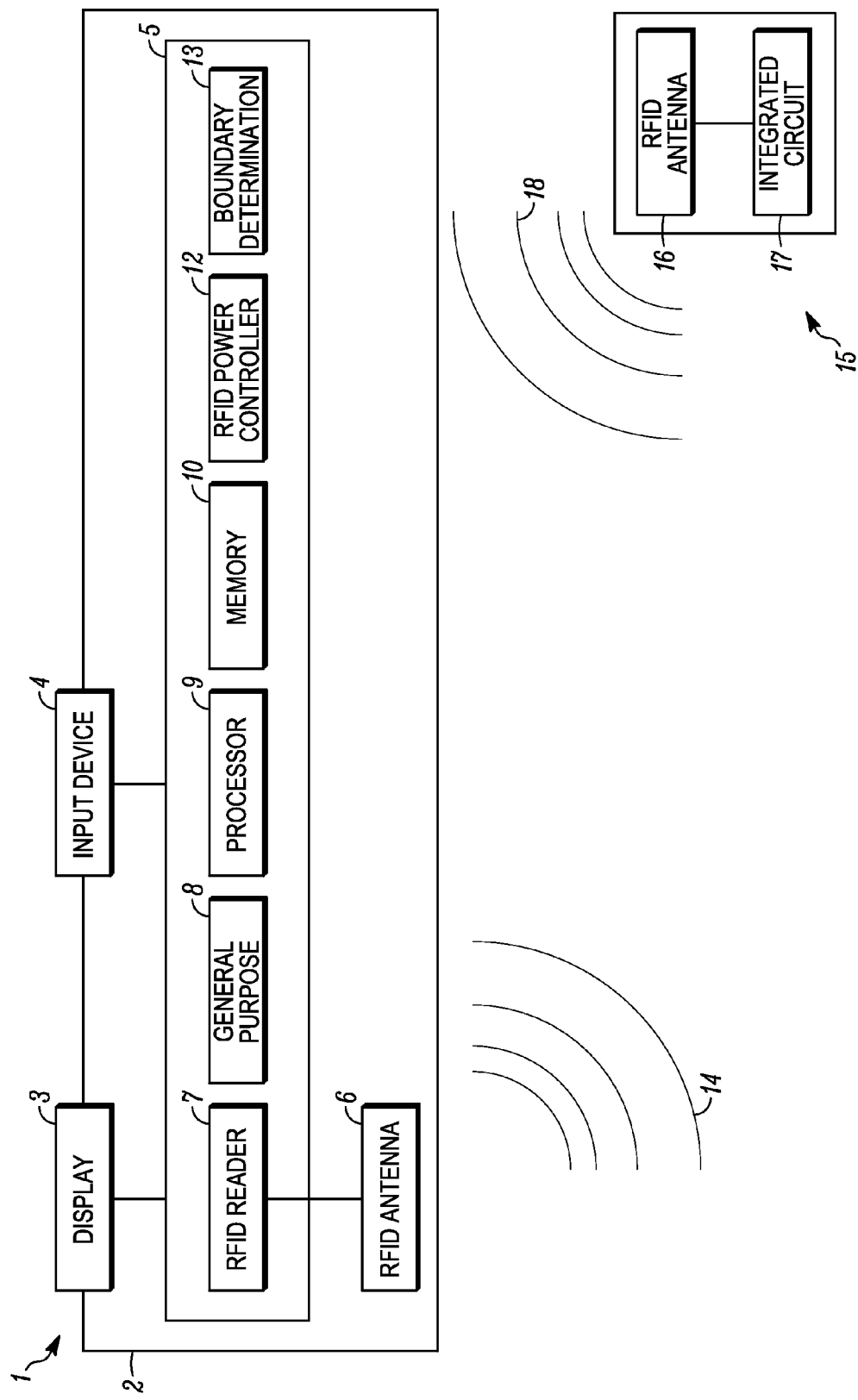
FIG. 1 is schematic diagram of an embodiment of an RFID reader and nearby RFID tag.

FIG. 1 is a schematic representation of an RFID reader 1, which is configured in accordance with an exemplary embodiment, communicating with an exemplary RFID tag 15. The RFID reader 1 is depicted in an oversimplified manner, and a practical embodiment can include many additional features and components. The RFID reader 1 generally includes a housing 2, a display element 3 that is visible from the outside of the housing 2, an input device 4 that is accessible from the outside of the housing 2, an electronics module 5 contained within the housing 2, and an RFID antenna 6 (which can be, but is not necessarily, contained within the housing 2). The input device 4 is preferably a keypad, though the RFID reader 1 can also include a touch panel or other input/output elements.

The display element 3 and input device 4 function as input/output elements for the operator of the RFID reader 1. The display element 3 and input device 4 can be coupled to the electronics module 5 as necessary to support input/output functions in a conventional manner. The electronics module 5 represents the hardware components, logical components, and software functionality of the RFID reader 1. In practical embodiments, the electronics module 5 can be physically realized as an integrated component, board, card, or package mounted within the housing 2. As depicted in FIG. 1, the electronics module 5 can be coupled to the RFID antenna 6 using suitable techniques. For example, the electronics module 5 and the RFID antenna 6 can be connected via an RF cable and RF connector assemblies.

The electronics module 5 may generally include a number of sub-modules, features, and components configured to support the functions described herein. For example, the electronics module 5 may include an RFID reader sub-module 7, a general purpose sub-module 8, at least one processor 9, memory 10, an RFID power controller sub-module 12, and a boundary determination sub-module 13. The distinct functional blocks of FIG. 1 are useful for purposes of description. In a practical embodiment, the various sub-modules and functions need not be distinct physical or distinct functional elements. In other words, these (and other) functional modules of the RFID reader 1 may be realized as combined processing logic, a single application program, or the like.

The RFID reader sub-module 7 is suitably configured to support RFID functions of the RFID reader 1. In this regard, the RFID reader sub-module 7 can include an RFID reader transceiver that generates RFID interrogation signals and receives reflected RFID signals generated by RFID tags in response to the interrogation signals. In the example embodiment described herein, the RFID reader sub-module 7 is designed to operate in the UHF frequency band designated for RFID systems. Alternate embodiments may instead utilize the High Frequency band or the Low Frequency band designated for RFID systems. The operation of RFID readers and RFID transceivers are generally known and, therefore, will not be described in detail herein. Notably, in this example embodiment, the RFID reader sub-module 7 is operable at various power levels, as controlled by the RFID power controller sub-module 12. The RFID power controller sub-module 12 can adjust the power of transmission of interrogation signals transmitted by the RFID antenna 6. Interrogation signals can be adjusted to reach varying distances from the RFID reader 1 as a result. Further description of the use of interrogation signals transmitted with varied power levels is provided below. The RFID power controller sub-module 12 can be embodied separately, or integrated with one or more other sub-modules, such as the general purpose sub-module 8.

The general purpose sub-module 8 is responsible for handling non-RFID functions of the RFID reader 1, as needed. For example, the general purpose sub-module 8 may include a wireless data communication element that supports bi-directional wireless data transfer using suitable wireless data transmission protocols and methodologies. In such a deployment, the RFID antenna 6 may be tuned to avoid RF interference with the wireless data communication elements. Alternatively (or additionally), the general purpose sub-module 8 can be configured to support data communication over physical connections.

As another example, the general purpose sub-module 8 may be configured to support data capture functions of RFID reader 1, where such data capture functions include one or more of: bar code reading; imaging; magnetic stripe reading; GPS data receiving; and IrDA. These data capture modes can be utilized to support traditional uses of the RFID reader 1, e.g., inventory control, tracking of packages, retail checkout, rental car returns, and other applications. Although not separately depicted in FIG. 1, the RFID reader 1 may include a data capture sub-module that is configured to support such data capture modes. Of course, the RFID antenna 6 may also be tuned to avoid RF interference with the data capture sub-module.

The processor 9 can be any general purpose microprocessor, controller, or microcontroller that is suitably configured to control the operation of the RFID reader 1. In practice, the processor 9 executes one or more software applications that provide the desired functionality for the RFID reader 1, including the operating features described in more detail below. The memory 10 may be realized as any processor-readable medium, including an electronic circuit, a semiconductor memory device, a ROM, a flash memory, an erasable ROM, a floppy diskette, a CD-ROM, an optical disk, a hard disk, an organic memory element, or the like. As an example, the memory 10 is capable of storing RFID data captured by the RFID reader 1.

The boundary determination sub-module 13 can perform boundary determination operations for the RFID reader 1. In some embodiments, the boundary determination sub-module 13 can cooperate with or be embodied as a component of the general purpose sub-module 8. Boundary determination can be used to evaluate the spatial relationship between the RFID reader 1 and various surrounding RFID tags, as described in greater detail below.

An RFID reader, such as the one described above, preferably is capable of functioning in one or more alternate modes, including the RFID reader mode. The primary functions of the RFID reader need not be limited to data capture and RFID tag interrogation. Rather, the RFID reader can be capable of multi-tasking and multi-functioning. Some functions, such as a bar-code scanner and alternate manual input interfaces, can also be present. In some embodiments, the RFID reader 1 can be a single device, while in others, multiple devices can combine various features to accomplish the functions listed above, and others desired for or necessary to the embodiment. An RFID reader, such as the one described above, is preferably used as in conjunction with the systems and methods described below.

An exemplary RFID tag 15 is also illustrated in FIG. 1. The RFID tag 15 comprises an RFID antenna 16 and an integrated circuit 17. The RFID antenna 16 is preferably capable of receiving and transmitting RF signals. The integrated circuit 17 represents one or more modules cooperating to store and process information, including processes for modulating and demodulating a RF signal.

The RFID antenna 6 is capable of transmitting an interrogation signal 14. The exemplary RFID tag 15 can be positioned within transmission range of the RFID reader 1. Accordingly, the RFID tag 15 can receive the interrogation signal 14 with its RFID antenna 16. The integrated circuit 17 can perform one or more operations in response, including modulating the interrogation signal 14. After modulation, the interrogation signal 14 can be transmitted from tag 15 with its RFID antenna 16 as a response signal 18. The RFID reader 1 can receive the response signal 18, and extract useful information from it, as conveyed by the RFID tag 15. Such use information includes, but is not limited to, the identity of the tag 15.

Figure 3:
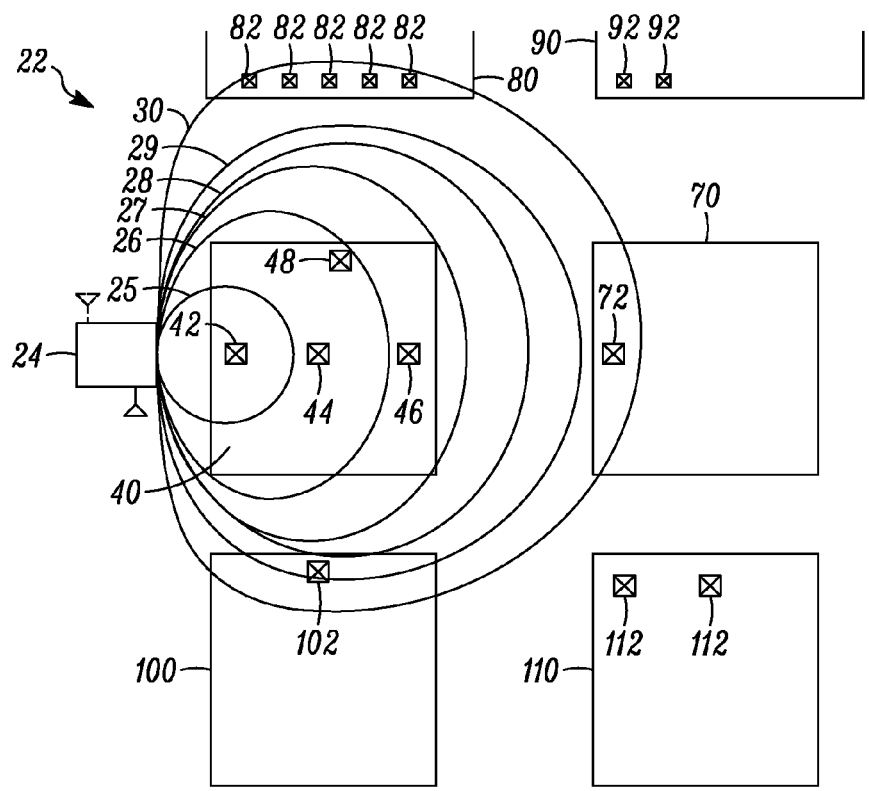
FIG. 3 is a schematic top view of the RFID tag position-finding system of FIG. 2.

FIGS. 2 and 3 illustrate an embodiment of an RFID system 22 adapted to use an RFID reader 24 to determine the identity of one or more near RFID tags 42, 44, 46, 48 in a position corresponding to a container 40. Preferably, the system 22 can associate the near RFID tags 42, 44, 46, 48 with the container 40 without including associations for distant RFID tags 52, 62, 72, 82, 92, 102, 112 present in surrounding containers 50, 60, 70, 80, 90, 100, 110. The RFID reader 24 can establish a difference in position between near RFID tags 42, 44, 46 and distant, or far, RFID tags 52, 62, 72, 82, 92, 102, 112 by transmitting interrogation signals to, and interpreting responses from RFID tags in, read zones 25, 26, 27, 28, 29, 30 of different sizes.

When transmitting an interrogation signal to the smaller-sized read zones 25, 26, 27 the RFID reader 24 will receive a response from the near RFID tags 42, 44, 46, 48. In response to interrogation signals of the size of the third read zone 27, all the near tags 42, 44, 46, 48 will have responded to at least one interrogation signal. Interrogation signals corresponding to the larger fourth and fifth read zones 28, 29 will not elicit response signals from any previously-non-responding, or new, RFID data tags. An interrogation signal corresponding to the sixth read zone 30 will receive a response from some of the far RFID tags 52, 72, 82, 102, permitting the deduction that a significant spatial distance exists between the near tags 42, 44, 46, 48 and the responding far tags 52, 72, 82, 102. The RFID reader 24 can then associate the near tags 42, 44, 46, 48 with the container 40, or the current position, as determined by and/or desirable to the user.

As described above, the RFID reader 24 can transmit interrogation signals with varying levels of power. In practice, the power level adjustment can be performed automatically or manually. In preferred embodiments, transmit power is adjusted automatically by the RFID reader 24 to accommodate the interrogation techniques described in more detail below. As an example, the RFID reader 24 can transmit an interrogation signal at power levels corresponding to read zones of different sizes, including the first read zone 25. The RFID reader 24 can then transmit a second interrogation signal at a power level corresponding to a second read zone 26, which is larger. Successive transmission can be at successively increasing power levels corresponding to the sizes of the illustrated read zones 25, 26, 27, 28, 29, 30, as well as larger and smaller read zones, as desired for the embodiment.

The read zones 25, 26, 27, 28, 29, 30 of the illustrated embodiment are depicted of a certain size and shape for visual clarity. Preferably, they are relatively related to interrogation signals transmitted with different levels of power. Certain embodiments and practices of the methods and systems can have read zones with different relative proportional relationships and different sizes. Thus, more read zones, with smaller incremental increases in size are possible, as well as fewer read zones with larger increases between successive zones. The resolution of the RFID reader 24 to determine tag distance or position can be related to the size of increase or decrease of the read zone. RFID readers with smaller step sizes between read zones will have a finer resolution than those with larger step sizes. Additionally, readers can have more than one transmitting antenna, as well as different types of antennas. Some readers can produce read zones of varying size by selectively operating one or more of the antennas, resulting in the size and shape of read zone desired. Thus, although spherical-shaped read zones are illustrated, other shapes, such as regular geometric and irregular shapes, including asymmetrical shapes, can also be used.

The RFID reader 24 can be informed as to the desired association for the RFID tags it will be interrogating and isolating. For example, its location or a specific container can be provided to the RFID reader 24 as described above. In the illustrated example, a plurality of RFID tags 42, 44, 46, 48 known as the near RFID tags are inside the near container 40. As shown in FIGS. 2 and 3, other distant containers can be containers 50, 60 positioned above the near container 40 and containers 70, 80, 90, 100, 110 positioned adjacent the near container 40. Each of the distant containers 50, 60, 70, 80, 90, 100, 110 can contain one or more distant RFID tags 52, 62, 72, 82, 92, 102, 112. The RFID reader 24 can be used to identify the near tags 42, 44, 46, 48 and associate them with the near container 40, preferably while isolating the tags in the near container 40 from other, distant tags 52, 62, 72, 82, 92, 102, 112.

The RFID reader 24 generally is not capable of determining a responding RFID tag's position, such as differentiating between the near tags 42, 44, 46, 48 and the distant tags 52, 62, 72, 82, 92, 102, 112, solely on the basis of their responsiveness without triangulation or other more sophisticated techniques. The RFID reader 24 can, however use varying read zone sizes to approximate the tag's distance from the RFID reader 24. The read zone corresponds to a volume of varying shape that has an outer boundary at the useful limit of the interrogation signal's transmission. Thus, a tag outside a given read zone will fail to receive an interrogation signal and, therefore fail to transmit a response signal. That tag can, however, receive an interrogation signal and respond if the read zone's size is increased to include its position. As one example, the near tag 44 will not respond to an interrogation signal transmitted to the first read zone 25, but will respond to a subsequent interrogation signal transmitted to the larger second read zone 26. Preferably, the RFID reader 24 remains stationary during operation, to accommodate the detection of read zones relative to stationary tags and the associated boundaries or containers. Because the RFID reader 24 is often hand-portable or sometimes attached to a vehicle, it can experience small movements or vibrations. Preferably, these are minimized, though some can be tolerated without disrupting operation of the RFID reader 24.

By varying the transmission power and corresponding read zone size, the RFID reader 24 can receive responses from RFID tags at varying distances and having corresponding positions from the RFID reader 24. Through interpretation of the results of the response signals and information indicative of the size of the read zone with which the response signals are associated, location associations for the tags can be determined One or more RFID tags can be associated with a location or region, or a container disposed in or at such a location or region, as a distinct spatial position. Such positions can be predefined and a priori information provided to one or more components of the system 22, such as the RFID reader 24, or the position of interest can be determined dynamically, through such technologies and methods as GPS location determination, dead-reckoning, or any other technique. Such location information can be provided to the system 22 by another component, wireless communication, and the like before, during, and/or after operation of the system. Thus, the discovery of RFID tags can be a cue to determine the location of the RFID reader 24 and associate one or more tags with the location.

During operation, the RFID reader 24 can transmit an interrogation signal to the first read zone 25. The near tag 42 within the first read zone 25 will return a response signal. The RFID reader 24 can record data conveyed in the response signal from the near tag 42, including an indication of the response signal, and associate it with the first read zone 25. Such an indication can include a data point or other recordation associating the response signal(s) with the read zone size which elicited the response(s). The content of the response signal can also be recorded, if desired. One or more table or hash entries in a storage program or database would be an example of an indication. After interrogation of the first read zone 25, the RFID reader 24 can determine the near tag 42 is the closest tag to the RFID reader 24 because it is the only responding tag. If multiple tags were positioned to respond, the RFID reader 24 would determine the set of tags closest to the RFID reader 24, but not individual positioning of the tags. A tag with information thus received from a response, associated, and recorded can be considered a recorded tag, for purposes of distinguishing new tags from already-responding, or recorded, tags.

A second interrogation signal can be sent to the second read zone 26, eliciting response signals from additional near tags 44, 48, as well as the already-recorded near tag 42. Because the second read zone 26 has a larger size, it corresponds to an interrogation signal transmitted at a higher power. As previously described, subsequent increasing read zone sizes correspond to interrogation signals of increased power, and decreasing read zone sizes correspond to interrogation signals of decreased power. The RFID reader 24 can associate and/or record the responding tags 42, 44, 48 with the second read zone 26 and transmit an interrogation signal corresponding to the third read zone 27. As all near tags 42, 44, 46, 48 are within the third read zone 27, the RFID reader 24 can receive response signals from all four and record their response. Such recordation can be complete, cumulative, and/or incremental, depending on implementation in the embodiment.

The fourth read zone 28 interrogation, however, will elicit no new responses. That is, the only signals made in response to the interrogation signal corresponding to the fourth read zone 28 will be for the near tags 42, 44, 46, 48, which the RFID reader 24 will have already associated with a previous, smaller read zone. This is due to the fact that, for this example, no tags reside in the area defined between zones 27 and 28. Similarly, no new responses will be received after interrogating the fifth read zone 29.

On the other hand, interrogation of the sixth read zone 30 can cause the interrogation signal to elicit responses from some distant RFID tags 52, 72, 82, 102, 112 together with the already-recorded near tags 42, 44, 46, 48. The RFID reader 24 can record the association of the sixth read zone 30 with the newly-responding, distant tags. As explained in more detail below, the subsequent detection of additional tags in this manner indicates that the RFID reader 24 has interrogated tags located in a different container or area of interest.

Determining which responses for each read zone are from new tags can be accomplished by comparing the response signals from the current read zone with stored data. For example, after transmission of the interrogation signal corresponding to the second read zone 26, response signals will be received from three near tags 42, 44, 48. Because the near tag 42 returned a response signal after interrogation of the first read zone 25, it was recorded as associated with the first read zone 25. Comparing the response signals from interrogation of the second read zone 26 with the first read zone 25, the RFID reader 24 can determine that the tags 44, 48 are positioned outside the first read zone 25, but within the second read zone 26. Thus, the RFID reader 24 can determine that near tag 42 is closer to the RFID reader 24 than the other near tags 44, 48. The response signals for the current read zone, with or without their association to the read zone size, can be stored before or after performing the comparison.

In evaluating the response and read zone information, the RFID reader 24 can associate the near tags 42, 44, 46, 48 with the near container 40. Preferably, the identity of the near container 40 can be provided to the RFID reader 24, either through manual entry of information, a bar code scanning, an RFID tag responding with a data tag response signal conveying container identification, or as previously described.

The RFID reader 24, or a data processing component receiving the data there from, can determine the approximate spatial relationship of the responding tags based on the read zone size. In evaluating the association of responding tags and successively-increasing read zone size, one or more read zone transmissions which do not elicit response signals from new data tags can be determined. Such a sequence of transmissions and responses suggests a space between RFID tag concentrations.

The space between RFID tag concentrations can be called "dead space". Such dead spaces occur when RFID tags are concentrated in different locations or regions, or when the RFID tags are placed within containers, and the containers disposed in different locations. As shown in the illustrated embodiment, preferably the containers are placed with a practical distance between them, permitting the determination of dead spaces between the containers. Thus, the position of the containers 50, 60, 70, 80, 90, 100, 110 containing distant RFID data tags 52, 62, 72, 82, 92, 102, 112 is such that sufficient distance between containers exists to inhibit overlapping response signals with tags in the near container 40 from RFID tags within adjacent or nearby containers 50, 60, 70, 80, 90, 100, 110.

The location of dead spaces surrounding the near container 40 can be established by determining which interrogation signals do not elicit responses from new tags. The near RFID tags 42, 44, 46, 48, which responded to interrogation signals having a read zone size smaller than the dead space, those read zones smaller than read zones which did not receive responses from new RFID tags, can be considered as the nearest concentration of RFID tags. Accordingly, with the known location or, in the illustrated example, near container 40, the association of the near RFID tags 42, 44, 46, 48 to the near container 40 can be made. In some embodiments, an association of the near RFID tags 42, 44, 46, 48 to a location corresponding to the container 40, such as a particular shelf, partition, or pallet can also be made.

Although the previous exemplary method is described with the use of successively-increasing read zone sizes, alternate approaches can be used. For example, the use of successively-decreasing sizes of the read zones 30, 29, 28, 27, 26, 25, can be practiced as reverse use. During reverse use, an interrogation signal corresponding to the largest size of the sixth read zone 30 can be transmitted first, with subsequent sizes of the read zones 25, 26, 27, 28, 29 successively decreasing. Like the increasing method, when decreasing read zones are used, dead spaces can be determined by detection of successive interrogation signals which cause responses from an unchanging set of RFID tags. Thus, when three interrogation signals corresponding to decreasing sizes of the read zones 29, 28, 27 are sent, only the near tags 42, 44, 46, 48 will respond, for each signal. When the second read zone 26 is used, the near tag 46 will not respond, and the RFID reader 24 can determine that a dead space was present surrounding the near tags 42, 44, 46, 48, as evinced by the unchanging responses for the sizes of the read zones 27, 28, 29.

Preferably, a dead space is only established after at least one tag is detected. Thus, if the first read zone were too small to include the nearest tag 42, it could be considered a dead space. Because no tag had yet been encountered, however, it is not. When detection by decreasing size is employed, the smallest read zone associated with a response from a tag is preferably used for purposes of establishing the location of the nearest container.

The RFID reader 24 also can incorporate both the approximate spatial size of its read zones and the expected container size into determining the location of dead spaces. For example, the RFID reader 24 can be operated such that the smallest read zone interrogated is approximately the same size as, or slightly smaller than, the expected size of the container.

Additionally, the threshold spatial distance for determining dead spaces preferably can be adjusted, either automatically in response to the results of interrogation or by the user. The threshold spatial distance is the distance between new tags, as established by detection with different-sized read zones, sufficient for the RFID reader 24 to consider the distance a dead space. Thus, when the threshold spatial distance is small, the distance between new tags responses necessary to constitute a dead space is small. Accordingly, many such gaps can occur under certain circumstances. A small threshold spatial distance, therefore, is useful when the tags of interest are tightly concentrated and/or large numbers of surrounding tags exist. Conversely, when a large threshold spatial distance is used, smaller gaps between new tags are ignored. A large threshold spatial distance is preferable when the tags of interest are loosely concentrated, or surrounding tags are relatively distant.

As one example of automatic adjustment, when the RFID reader 24 terminates operation without establishing a dead space, it can decrease the threshold spatial distance between new tags to compensate, if desired. Similarly, when large numbers of dead spaces are encountered during operation, the threshold spatial distance between tags constituting dead spaces can be increased, either automatically or manually, resulting in fewer qualifying distances, and increased likelihood of accurately associating RFID tags.

After transmission of all interrogation signals, the recorded responses can be evaluated to determine which RFID tags are present in a concentration closer to the RFID reader 24 than the determined dead space. The nearby tags can then be associated with the container, region, or position, as desired, by the RFID reader 24. In addition to the decreasing method, similar approaches using read zones of alternating increasing and decreasing size or random sizes can be used to determine the same associations. Information regarding the determined associations can then be stored.

Preferably, demarcation of tag concentration can be obtained through adjustment of the read zone step size used by the RFID reader 24 and the space between containers to assure that the resolution of the RFID reader 24 is sufficient to detect dead spaces. One or two interrogation signals are described as being sent to corresponding read zones without new results to determine dead spaces. In certain embodiments, any number of signals eliciting responses from no new RFID tags can be used to determine a dead space depending on the configuration of the system. Such a number of signals can range from a single response association to hundreds or thousands. The number useful for determining a dead space can depend on the number of interrogation signals sent and the read zones associated with the signals, among other factors. Each configuration can be adjusted as desirable for the embodiment.

Similarly, confidence in the accuracy of the result of a particular read zone size, in view of possible RF or physical interference, can be augmented by comparing the response results of interrogation signals corresponding to an identical read zone size. Repeated results after several interrogations for the same read zone size increases the likelihood that the results are an accurate representation of the tags present in the read zone. By contrast, if repeated interrogations to the same read zone size result in widely-differing RFID tag responses, when examined either for number of tags or type of the tags, the likelihood of interference increases, and confidence in the results decreases. Such feedback can be provided to the user of the reader.

Figure 4:
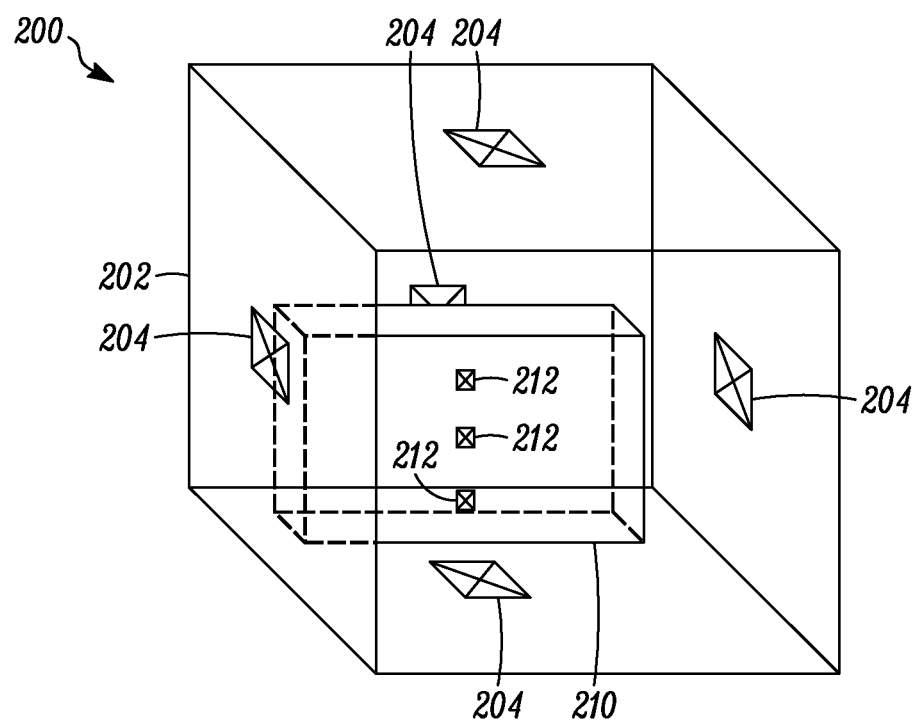
FIG. 4 is a perspective view of a container and RFID tag associating system.
Figure 5:
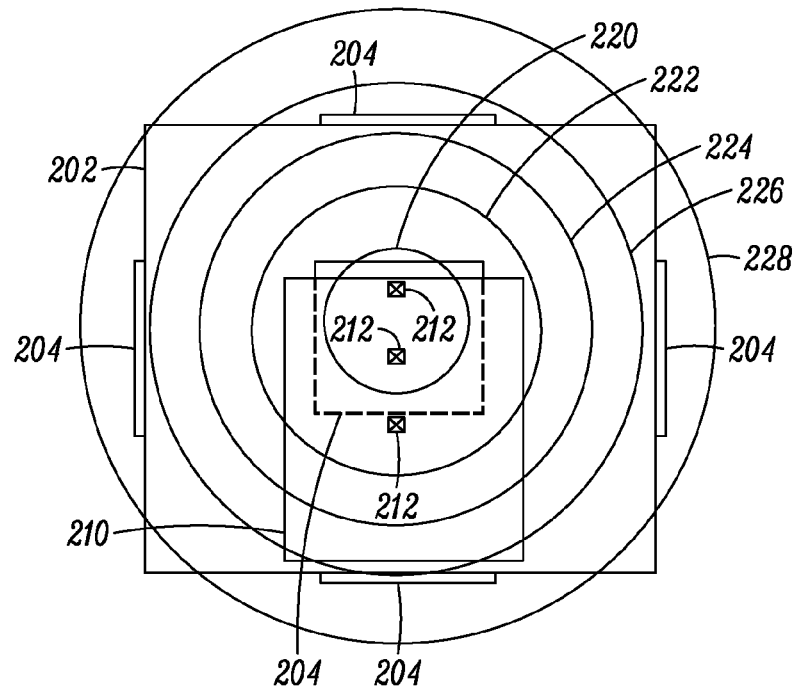
FIG. 5 is a front view of the RFID tag associating system of FIG. 4.
Figure 6:
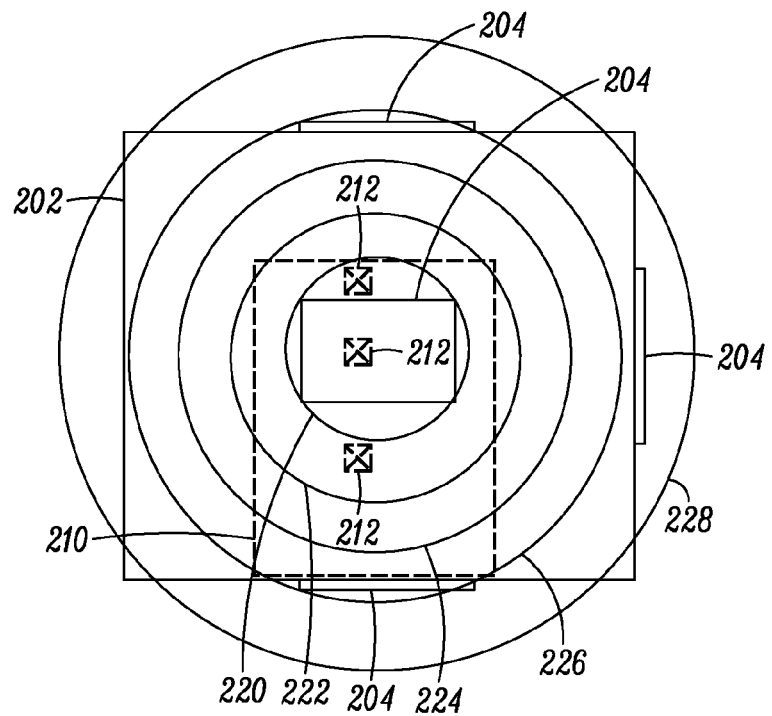
FIG. 6 is a side view of the RFID tag associating system of FIG. 4.

FIGS. 4-6 illustrate an embodiment of a system 200 used to associate one or more RFID tags with a particular location. FIG. 4 illustrates a perspective view of the system 200, including a location 202 with boundaries indicated by boundary RFID tags 204 and a container 210, such as a box or pallet, disposed in the location 202. At least one boundary of the location 202 does not have a boundary tag 204, indicating unobstructed access. FIG. 5 illustrates a view from the front, through the unobstructed boundary, while FIG. 6 illustrates a side view.

The system includes a reader (not shown) transmitting interrogation signals corresponding to read zones 220, 222, 224, 226, 228 of various sizes. Preferably, the largest read zone 228 is of sufficient size to receive a response from each boundary tag 204. The boundary tags 204 can be disposed on walls, floors, partitions, shelves, and/or ceilings, as appropriate to the location 202 and boundary.

The container 210 can be a box or crate, as described above, with multiple items disposed within. The container 210 can contain one or more container tags 212, which can be affixed or attached to items within the container 210. The container tags 212 can be interrogated and respond in a manner similar to that described above.

Although multiple container tags 212 are illustrated as indicative of multiple items within the container 210, a single container tag 212 can be used in some embodiments. For such embodiments, the use of the single container tag 212 can be combined with the information from the boundary RFID tags 204 to associate the container 210 itself, as distinct from items within the container 210, with the location 202 indicated by the boundary RFID tags 204.

In some embodiments, the number of boundary RFID tags 204 can vary. Some locations can use boundary RFID tags 204 on faces of the location's approximate cubic shape as shown, while others can dispose them on vertices, and still others can use a combination as desired for the embodiment, including the size and shape of the location 202. Preferably, the boundary RFID tags 204 are positioned a suitable distance from other boundary RFID tags, and thus a suitable distance from the boundary of an adjacent or nearby location, so as to prevent overlapping readings by the reader.

When operated, the system 200 can determine the location 202 and container tag 212 present in the container 210 in a manner similar to that described above with respect to dead spaces. Instead of detecting dead spaces, however, the reader can be operated to adjust the size of the read zone 220, 222, 224, 226, 228 to determine which tag are within the area defined by the boundary tags 204 (i.e., container tag 212). Thus, the read zone size can be increased until a response is received from at least one boundary tag 204, or from multiple boundary tags 204, such as two, four, or five, or as many as useful in the embodiment.

After receiving a response from the boundary tags 204, the reader can determine that the container tags 212 are closer to the reader than the boundary tags 204 and associate them with the location 202. In certain embodiments, where a single container tag 212 corresponds to the container 210 itself, the container 210 can similarly be associated with the location 202. Even if boundary tags corresponding to nearby locations respond to one or more interrogation signals, the boundary tags 204 of the location 202 are preferably responsive to interrogation signals of a smaller read zone size, and distinct from the more distant boundary tags.

Figure 7:
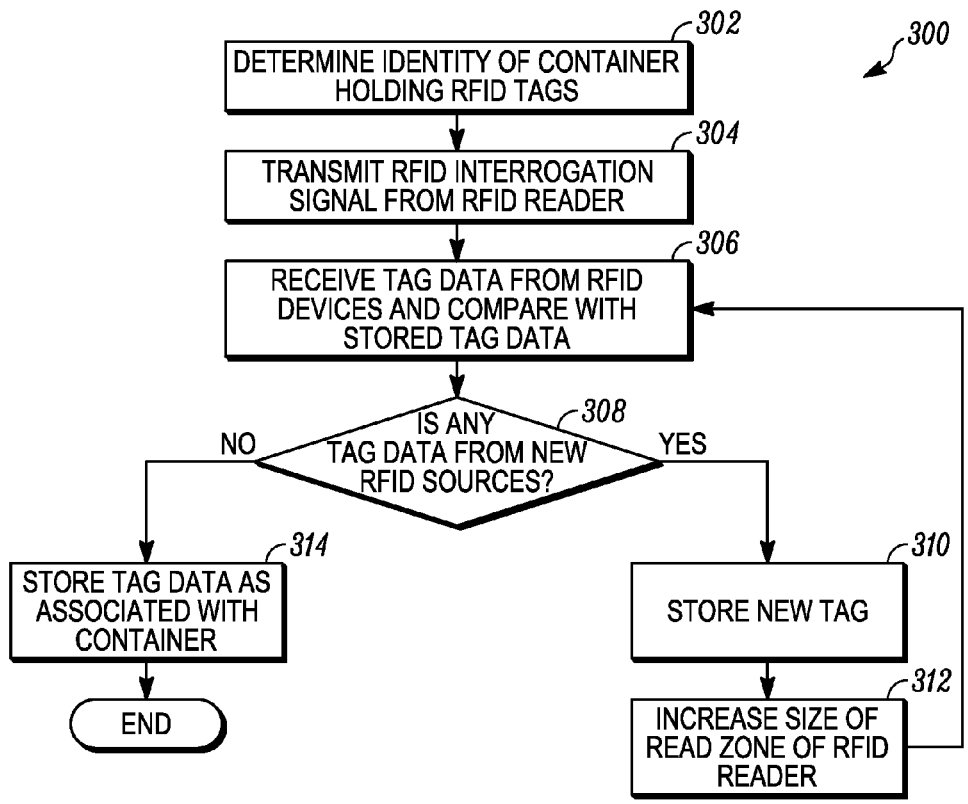
FIG. 7 is a schematic illustration of a method of associating an RFID tag with a position.
Figure 8:
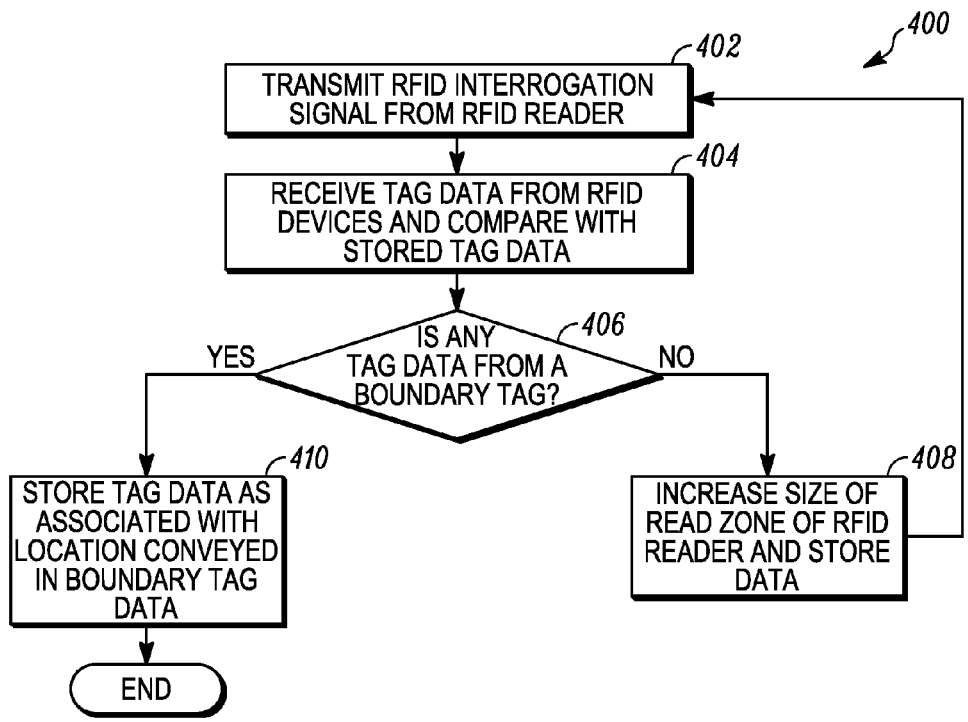
FIG. 8 is a schematic illustration of another method of associating an RFID tag with a position.

FIGS. 7 and 8 are flow charts which illustrate embodiments of RFID tag location determination and/or association processes 300, 400, which may be performed by an RFID system. The various tasks performed in connection with processes 300, 400 may be performed by software, hardware, firmware, or any combination thereof. For illustrative purposes, the following description of processes 300, 400 may refer to elements mentioned above in connection with FIGS. 1-6. In embodiments of the invention, portions of processes 300, 400 may be performed by different elements of the described system, e.g., an RFID reader or a computing device that is coupled to an RFID reader. It should be appreciated that processes 300, 400 may include any number of additional or alternative tasks; the tasks shown in FIGS. 7 and 8 need not be performed in the illustrated order, and processes 300, 400 may be incorporated into a more comprehensive procedure or process having additional functionality not described in detail herein.

FIG. 7 illustrates the steps of a method or process 300 corresponding to determining RFID tags by locating a dead space surrounding the tags. In some embodiments, initially, the container or location can be identified 302 for purposes of RFID tag association. The reader can then transmit 304 an RFID interrogation signal corresponding to a first read zone. The reader can receive 306 response signals from RFID tags within the first read zone and record their presence, together with the size (or an indicator of the size) of the read zone which elicited the response(s). The reader can compare the current results with stored data, or record all data, and subsequently compare the most recent set with past data records. The reader can determine if tag data is received 308 in a response which corresponds to a new tag, such as a tag which did not respond to a previous interrogation signal or read zone size. In the event that a response is received from a new tag, the response can be stored 310, if not already done during comparison 306. The reader can then be adjusted 312 to transmit 304 another interrogation signal corresponding to a larger read zone size.

In the event that a response is not received from any new tags, the reader can determine that a dead space has been encountered. The tags which had previously responded can then be associated 314 with the container, region, and/or location. As previously mentioned, in some embodiments, more than one interrogation signal with responses from no new tags can be required as a threshold to determining association of tags with a container, and designation of a dead space. Thus, although the method reaches 314 this conclusion after a single transmission of an interrogation signal with no new tags responding, certain embodiments and practices of the method can have different thresholds and criteria.

FIG. 8 illustrates a method 400 of associating one or more RFID tags with a location. The location can have one or more boundary RFID tags placed along its edges, demarcating its extent. An RFID reader can transmit 402 an interrogation signal corresponding to a read zone of a first size. The reader can then receive 404 responses from any RFID tags within the first read zone. The responses of those RFID tags can be associated with the read zone, and the response/association data evaluated 404 against any presently stored tag data. The tag data received and associated with the read zone can then be evaluated 406 to determine if any responses are from a boundary RFID tag. If not, the size of the read zone can be increased 408 and the tag data stored for future evaluation. An interrogation signal with the second, larger read zone can then be transmitted 402, continuing the method.

In the event that at least one of the responses received is 410 from a boundary RFID tag, the reader or other unit performing the method 400 can record or store the tag/association data as associated with the location conveyed by the boundary RFID tag. Any non-boundary tags from which data was received in the same read zone as the boundary RFID tag can be associated with the location as well. As described above, a container can be associated with a location or region by receiving a response from an RFID tag within, affixed to, or attached to the container prior to an interrogation signal which receives a response from a boundary tag.

In certain embodiments, the responses of RFID tags and the read zone associated with the interrogation signal eliciting the responses can be stored prior to comparison against other stored data, as appropriate or desired for the embodiment. Also, while one boundary RFID tag detection is described as sufficient for associating stored tag data with the location information conveyed by the boundary RFID tag, other methods can continue to increase the read zone until responses from a larger number, such as 2, 4, 8, etc., of boundary tags are received.

Moreover, while methods 300, 400 are described in the context of increasing read zone size, as described before, other adjustments to the read zone can also be performed, which can result in correct tag/location association. Additionally, the methods 300, 400 can be tailored to individual embodiments of RFID readers, incorporating particular features of each when practicing the methods 300, 400. For example, the maximum read zone size can correspond to the maximum transmission power of interrogation signals of an RFID reader.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of determining an identity of one or more radio-frequency identification (RFID) tags of a plurality of RFID tags within a region, the method comprising:
   transmitting an interrogation signal with an RFID reader corresponding to a read zone having a first size;
   receiving a response from a first RFID tag of the plurality of RFID tags located within the read zone;
   recording an indicator of the response for the first RFID tag that designates the first RFID tag as a first recorded tag;
   increasing the size of the read zone to a second size within the region;
   receiving a second response from a second RFID tag of the plurality of RFID tags if the second RFID tag is located within the read zone having the second size;
   recording a second indicator of the second response for the second RFID tag that designates the second RFID tag as a second recorded tag if the second response is received from the second RFID tag; and
   associating the first recorded tag with the region; and
   associating the second recorded tag with the region if the second indicator designates the second RFID tag as the second recorded tag.

2. The method of claim 1, wherein the increasing the size of the read zone of the RFID reader comprises successively increasing the size of the read zone and transmitting successive interrogation signals to the read zone after each increase in the size of the read zone.

3. The method of claim 2, wherein the read zone has a substantially spherical shape.

4. The method of claim 2, wherein the increasing the size of the read zone of the RFID reader comprises receiving responses from additional RFID tags of the plurality of RFID tags, wherein additional indicators are recorded for the additional RFID tags that designate the additional RFID tags as additional recorded tags in response to the transmitting of the successive interrogation signals.

5. The method of claim 1, wherein increasing the size of the read zone of the RFID reader comprises:
   transmitting a third interrogation signal corresponding to the read zone having a third size that is greater than the second size and that substantially corresponds to the region; and
   receiving a third response from a third RFID tag of the plurality of RFID tags if the third RFID tag is located within the read zone having the third size;
   recording a third indicator of the third response for the third RFID tag that designates the third RFID tag as a third recorded tag if the third response is received from the third RFID tag; and
   associating the third recorded tag with the region if the third indicator designates the third RFID tag as the third recorded tag.

6. The method of claim 1, further comprising:
   storing an association for the first recorded tag with the region; and
   storing a second association for the second recorded tag with the region if the second indicator designates the second RFID tag as the second recorded tag.

7. A method of determining an association of a plurality of radio-frequency identification (RFID) tags with a container, the method comprising:
   transmitting a first interrogation signal corresponding to a read zone having a first size;
   receiving a response from a first RFID tag of the plurality of RFID tags that is disposed within the container located within the read zone;
   recording an indicator of the response of the first RFID tag as a first recorded RFID tag that designates the first RFID tag as a first recorded RFID tag;
   transmitting a second interrogation signal corresponding to a second read zone having a second size;
   receiving a second response from a second RFID tag of the plurality of RFID tags if the second RFID tag is located in the second read zone with the second size;
   recording a second indicator of the second response for the second RFID tag that designates the second RFID tag as a second recorded RFID tag if the second response is received from the second RFID tag;

associating the first recorded RFID tag with the container; and associating the second recorded RFID tag with the container if the container is located within the second read zone.

8. The method of claim 7, where the second size is larger than the first size.

9. The method of claim 8 further comprising:

transmitting a third interrogation signal corresponding to a third read zone having a third size that is larger than the first size and smaller than the second size;

receiving a third response from a third RFID tag in the third read zone of the third size without receiving the third response from the third RFID tag in the read zone of the first size;

recording a third indicator of the third response of the third RFID tag as a third recorded RFID tag that designates the third RFID tag as the third recorded RFID tag; and associating the third recorded RFID tag with the container if the container is located within the third read zone.

10. The method of claim 7, wherein the container comprises a container RFID tag adapted to convey tag data corresponding to the container and the method further comprises receiving the tag data from the container RFID tag.

11. The method of claim 10, wherein associating the first recorded RFID tag and associating the second recorded RFID tag with the container comprises associating the first recorded RFID tag and the second recorded RFID tag with the tag data from the container RFID tag.

12. A method of associating radio-frequency identification (RFID) tags with a location, the location having a plurality of boundaries designated by a plurality of boundary RFID tags, the plurality of boundary RFID tags adapted to convey tag data corresponding to the location, and the method comprising:

transmitting an interrogation signal to a read zone having a first size with an RFID reader;

receiving a response from a first RFID tag within the read zone;

increasing the size of the read zone until the RFID reader receives the tag data from at least one of the plurality of boundary RFID tags; and associating the first RFID tag with the tag data conveyed by the at least one of the plurality of boundary RFID tags.

13. The method of claim 12, wherein increasing the size of the read zone comprises increasing the size of the read zone until the RFID reader receives the tag data from at least two boundary RFID tags of the plurality of boundary RFID tags.

14. The method of claim 13, wherein increasing the size of the read zone comprises increasing the size of the read zone until the RFID reader receives the tag data from at least four boundary RFID tags of the plurality of boundary RFID tags.

15. The method of claim 12, further comprising shaping the read zone to provide the read zone with a substantially asymmetrical shape.

16. The method of claim 12, further comprising storing an association for the first RFID tag with the tag data conveyed by the plurality of boundary RFID tags.

17. The method of claim 12, wherein transmitting the interrogation signal comprises transmitting the interrogation signal from multiple antennas of the RFID reader.

* * * * *